US011887088B2

(12) United States Patent
Yarra et al.

(10) Patent No.: US 11,887,088 B2
(45) Date of Patent: Jan. 30, 2024

(54) SMART MODERATION AND/OR VALIDATION OF PRODUCT AND/OR SERVICE DETAILS IN DATABASE SYSTEMS

(71) Applicant: Salesforce, Inc., San Francisco, CA (US)

(72) Inventors: Phaneendra Babu Yarra, Komerapudi (IN); Seetendra Singh Sengar, Hyderabad (IN); Nitesh Dewani, Agra (IN); Divyapal Singh Yaduvanshi, Th. Anta (IN)

(73) Assignee: Salesforce, Inc., San Francisco, CA (US)

( * ) Notice: Subject to any disclaimer, the term of this patent is extended or adjusted under 35 U.S.C. 154(b) by 382 days.

(21) Appl. No.: 16/749,021

(22) Filed: Jan. 22, 2020

(65) Prior Publication Data

US 2021/0224885 A1 Jul. 22, 2021

(51) Int. Cl.

| | |
|---|---|
| ***G06Q 30/06*** | (2023.01) |
| ***G06Q 20/12*** | (2012.01) |
| ***H04L 51/10*** | (2022.01) |
| ***H04L 51/212*** | (2022.01) |

(52) U.S. Cl.

CPC ......... *G06Q 20/1235* (2013.01); *H04L 51/10* (2013.01); *H04L 51/212* (2022.05)

(58) Field of Classification Search

None

See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |

(Continued)

FOREIGN PATENT DOCUMENTS

| | | | | |
|---|---|---|---|---|
| WO | WO-2012051943 A1 * | 4/2012 | ......... | G06F 16/5846 |
| WO | WO-2018115346 A1 * | 6/2018 | ............. | G01B 11/24 |

*Primary Examiner* — Yves Dalencourt

(74) *Attorney, Agent, or Firm* — Kwan & Olynick LLP

(57) ABSTRACT

In accordance with embodiments, there are provided mechanisms and methods for facilitating smart moderation and/or validation of product and/or service details in database systems according to one embodiment. In one embodiment and by way of example, a method includes identifying images as a media description associated with a product, wherein the media description to be communicated using one or more media outlets over one or more communication networks, and wherein the images are captured using one or more cameras; detecting an image having an object potentially not suitable for communication based on a rule; assigning a score to the object; comparing the score to a threshold reflecting a minimum level of suitability for communication of the media description based on the rule; disallowing the object or the image to be communicated when the score is less than the threshold; and facilitating publication, by a website, of the media description without the object or the image.

18 Claims, 11 Drawing Sheets

400

401 IDENTIFY A TRANSACTION TO UPLOAD PRODUCT DETAILS RELATING TO PRODUCT, WHERE PRODUCT DETAILS INCLUDE PRODUCT/SERVICE NAME, PRODUCT TEXT DESCRIPTION, AND PRODUCT IMAGE/VIDEO DESCRIPTION AT COMPUTING DEVICE

403 OBJECTS IN PRODUCT IMAGE/VIDEO DESCRIPTION ARE SCANNED AND SCORES ARE ASSIGNED TO OBJECTS

405 COMPARE OBJECT SCORES TO THRESHOLD SCORE TO DETERMINE WHETHER IMAGES/VIDEOS OF OBJECTS ARE SUITED FOR PUBLICATION

407 OBJECT SCORES ARE EQUAL TO OR GREATER THAN THRESHOLD SCORE?

YES

409 OBJECT APPROVED, AND ANY PRODUCT DETAILS ALLOWED TO BE POSTED/ PUBLISHED TO DESCRIBE PRODUCT

NO

411 OBJECT REJECTED FOR VIOLATION OF MODERATION RULE, AND VIOLATION ERROR NOTIFICATION IS ISSUED AND DISPLAYED TO USER AS WARNING OF RULE VIOLATION

413 COMMUNICATE ANY PERTINENT INFORMATION ABOUT OBJECT AND MODERATION RULE TO USER TO RENDER FINAL DECISION ON APPROVAL OR DISAPPROVAL OF TRANSACTION

(56) References Cited

U.S. PATENT DOCUMENTS 5,873,096 A 2/1999 Lim et al.
5,918,159 A 6/1999 Fomukong et al.
5,963,953 A 10/1999 Cram et al.
6,092,083 A 7/2000 Brodersen et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
6,295,530 B1 9/2001 Ritchie et al.
6,324,568 B1 11/2001 Diec
6,324,693 B1 11/2001 Brodersen et al.
6,336,137 B1 1/2002 Lee et al.
D454,139 S 3/2002 Feldcamp
6,367,077 B1 4/2002 Brodersen et al.
6,393,605 B1 5/2002 Loomans
6,405,220 B1 6/2002 Brodersen et al.
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker et al.
6,829,655 B1 12/2004 Huang et al.
6,842,748 B1 1/2005 Warner et al.
6,850,895 B2 2/2005 Brodersen et al.
6,850,949 B2 2/2005 Warner et al.
7,058,903 B1 * 6/2006 Jonach .................. G06F 3/0481 715/834
7,289,976 B2 10/2007 Kihneman et al.
7,340,411 B2 3/2008 Cook
7,620,655 B2 11/2009 Larsson et al.
10,262,041 B2 * 4/2019 McCoy ................... G06F 16/33
10,904,311 B1 * 1/2021 Surazski ............. H04L 65/1066
2001/0044791 A1 11/2001 Richter et al.
2002/0022986 A1 2/2002 Coker et al.
2002/0029161 A1 3/2002 Brodersen et al.
2002/0029376 A1 3/2002 Ambrose et al.
2002/0035577 A1 3/2002 Brodersen et al.
2002/0042264 A1 4/2002 Kim
2002/0042843 A1 4/2002 Diec
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.
2002/0143997 A1 10/2002 Huang et al.
2002/0152102 A1 10/2002 Brodersen et al.
2002/0161734 A1 10/2002 Stauber et al.
2002/0162090 A1 10/2002 Parnell et al.
2002/0165742 A1 11/2002 Robins
2003/0004971 A1 1/2003 Gong et al.
2003/0018705 A1 1/2003 Chen et al.
2003/0018830 A1 1/2003 Chen et al.
2003/0066031 A1 4/2003 Laane
2003/0066032 A1 4/2003 Ramachadran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker
2003/0088545 A1 5/2003 Subramaniam et al.
2003/0120675 A1 6/2003 Stauber et al.
2003/0151633 A1 8/2003 George et al.
2003/0159136 A1 8/2003 Huang et al.
2003/0187921 A1 10/2003 Diec
2003/0189600 A1 10/2003 Gune et al.
2003/0191743 A1 10/2003 Brodersen et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan, Jr. et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2009/0177744 A1 7/2009 Marlow et al.
2010/0154023 A1 * 6/2010 Dey ................... H04N 21/4402 725/151
2012/0158632 A1 * 6/2012 Grenier ................... G06F 16/35 706/45
2013/0227016 A1 * 8/2013 Risher ................... G06F 16/248 709/204
2016/0275343 A1 * 9/2016 Dinerstein ........... G06V 40/162
2017/0301063 A1 * 10/2017 Merhav ................ G06N 3/0454
2019/0073593 A1 * 3/2019 Luo ........................ G06N 3/088
2019/0188361 A1 * 6/2019 Chow ................ H04N 21/2225
2020/0036665 A1 * 1/2020 Rodriguez Bravo ........................ H04L 67/535
2020/0099982 A1 * 3/2020 Fajardo ................ H04N 21/266
2020/0242750 A1 * 7/2020 Kokkula ................ G06V 10/75
2020/0412787 A1 * 12/2020 Pichaimurthy ....... H04L 65/756
2021/0099743 A1 * 4/2021 Mese ................ H04N 21/4532

* cited by examiner

Moderation Rules

Settings

371

Product Moderation Rules

Product moderation rules helps in blocking and reviewing images and videos uploaded to describe products

- ☐ Nudity
- ☑ Drugs 373
- ☑ Weapons 375
- ☑ Alcohol 377
- ☐ Hate Signs
- ☐ Violence Cancel Save ssengar-ltm: ~ ssengar$ curl -X GET 'http: //api.sightengine.com/1.0 weapon-alcohol-drugs.json?
Api_user+898453fbBDEQYgdi5bBDEQYgdi5dDQzZ&url=https://amazonaws.com/imagga-demo-uploads/tagging-demo/64c08d08f8b2b44faB20f1698b9b6a
{
"status": "success",
"request": {
"id":"req_624oSu0ftyxq8hVYw8fDG",
"timestamp":1569504503.420202
"operations":1
},
"weapon" :0.0055
"alcohol":0.878,
"drugs" :0,
"media":{
"id":med_624oPFNgBuavWE0EEOEp3"
"uri":"https://s3.amazonaws.com/imagga-demo-uploads/tagging-demo
64c08d08fb2b44fa820f1698b9b68ea.jpg 383
381

*FIG. 3G*

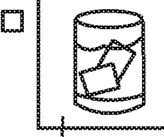

*FIG. 3H*

SMART MODERATION AND/OR VALIDATION OF PRODUCT AND/OR SERVICE DETAILS IN DATABASE SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate smart moderation and/or validation of product and/or service details in database systems.

BACKGROUND

Conventional techniques do not provide for automatic or intelligent ways for identifying illegal or offensive language relating to products across various media formats. Such conventional techniques are manual, slow, and error-prone, and incapable of working with third-party systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

FIGS. 3D-3H illustrate a transaction sequence for facilitating moderation of product/service description according to one embodiment.

SUMMARY

Figure 1:
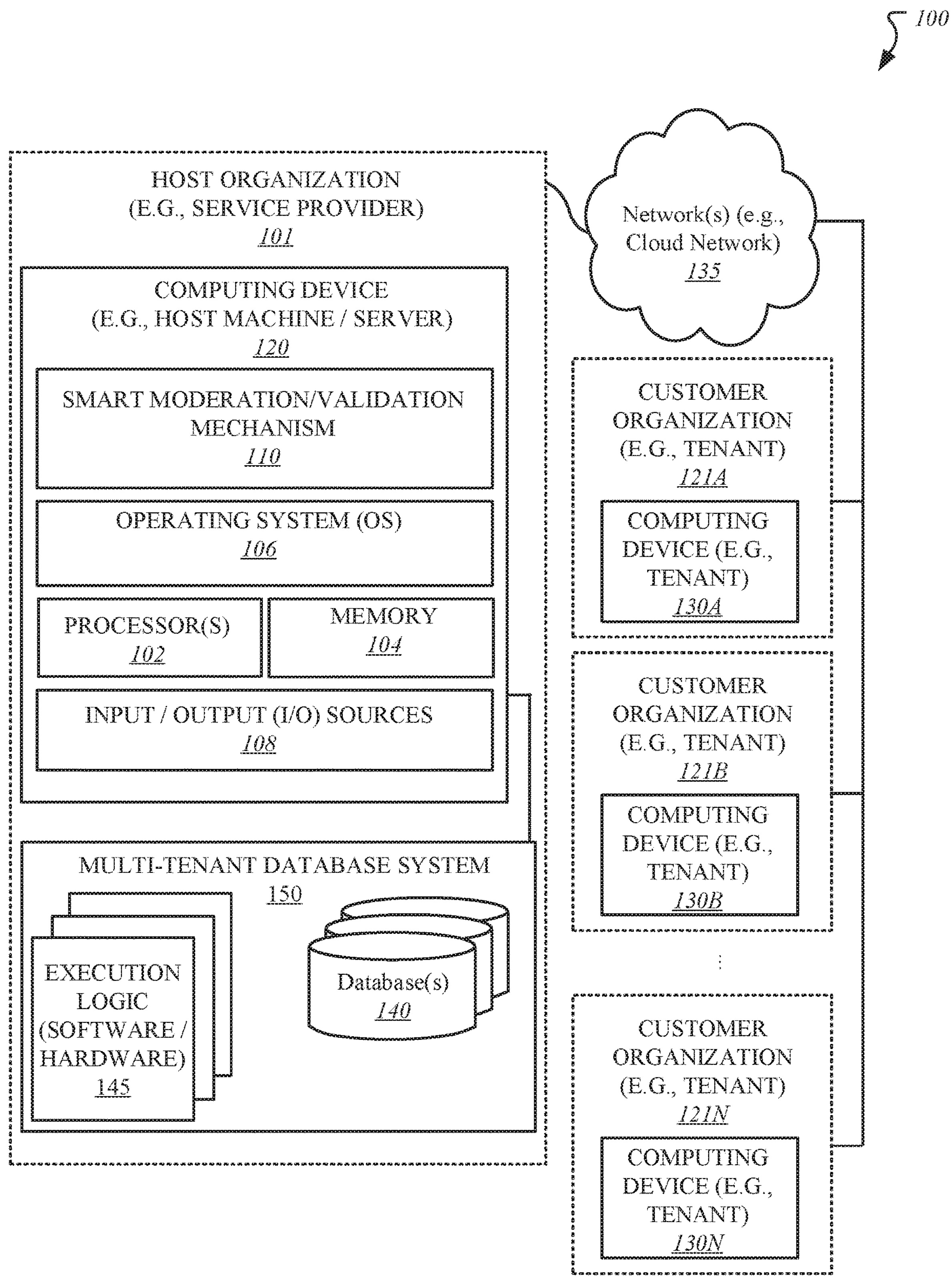
FIG. 1 illustrates a system having a computing device employing a smart moderation/validation mechanism according to one embodiment.

In accordance with embodiments, there are provided mechanisms and methods for facilitating smart moderation and/or validation of product and/or service details in database systems according to one embodiment. In one embodiment and by way of example, a method includes identifying images as a media description associated with a product, wherein the media description to be communicated using one or more media outlets over one or more communication networks, and wherein the images are captured using one or more cameras; detecting an image having an object potentially not suitable for communication based on a rule; assigning a score to the object; comparing the score to a threshold reflecting a minimum level of suitability for communication of the media description based on the rule; disallowing the object or the image to be communicated when the score is less than the threshold; and facilitating publication, by a website, of the media description without the object or the image While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for moderation and/or validation of descriptions having contents relating to products or services to be advertised or promoted over a variety of media outlets using multiple media formats. Such products or services may be associated with multiple tenants in a multi-tenant database environment, where the tenants and the service provide (e.g., Salesforce.com®) may wish to maintain the products/services' reputation in good standing by removing any language for their descriptions that might be regarded as illegal, offensive, or sensitive, etc., whether it be globally or locally.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a smart moderation/validation mechanism 110 according to one embodiment. In one embodiment, smart moderation/validation mechanism 110 provides for a novel technique for facilitating moderation and/or validation of production descriptions in database systems.

As illustrated, in one embodiment, computing device 120, being part of host organization 101 (e.g., service provider, such as Salesforce.com®), represents or includes a server computer acting as a host machine for smart moderation/validation mechanism 110 for facilitating creating and using an intelligent data-loader for facilitating efficient bulk loading/inserting of data records in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of smart moderation/validation mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Management ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™ Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
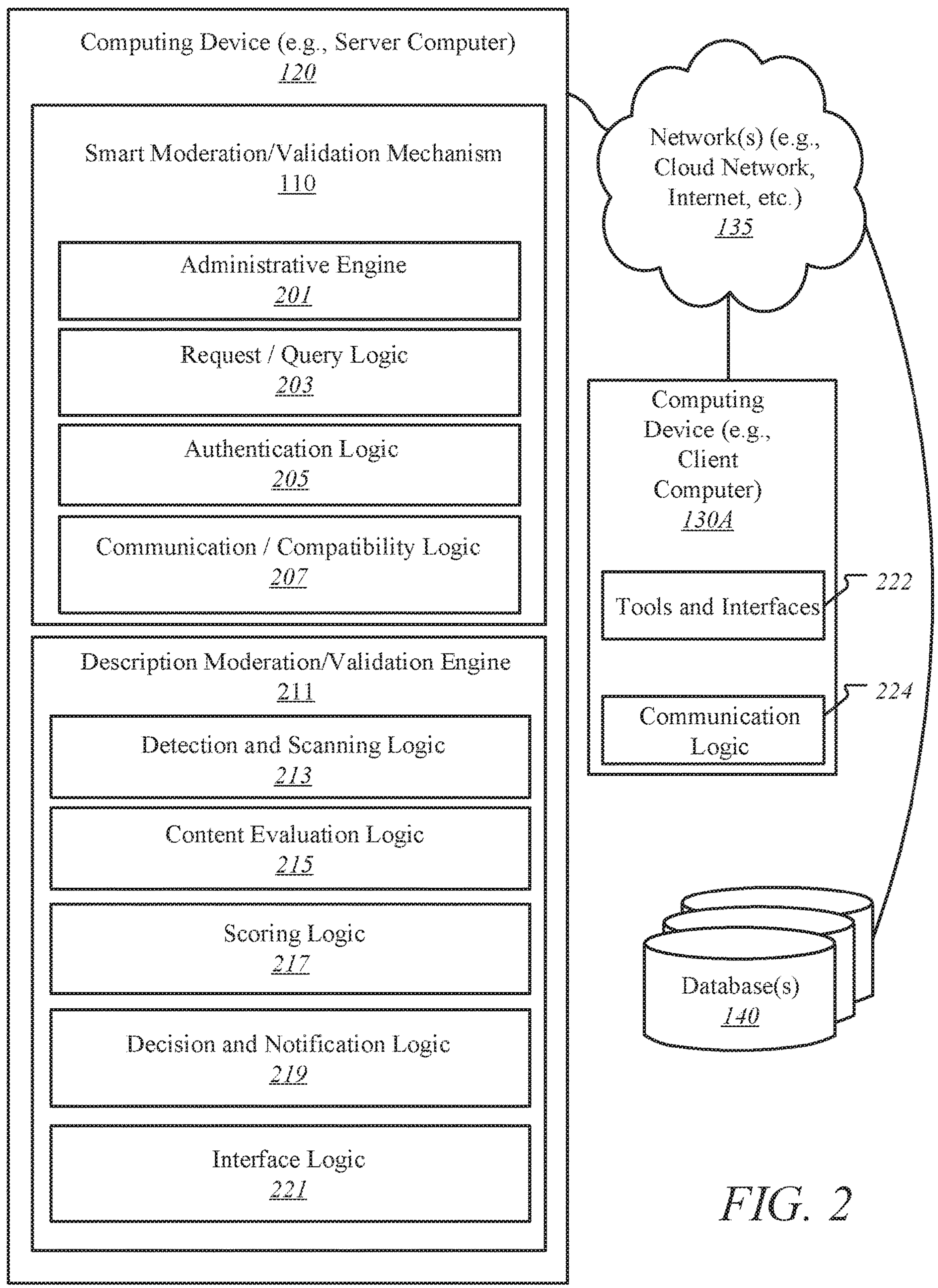
FIG. 2 illustrates a smart moderation/validation mechanism according to one embodiment.

FIG. 2 illustrates smart moderation/validation mechanism 110 of FIG. 1 according to one embodiment. In one embodiment, smart moderation/validation mechanism 110 provides for facilitating moderation and/or validation of descriptions relating to products associated with tenants in multi-tenant database systems, where smart moderation/validation mechanism 110 includes any number and type of components, such as administration engine 201 having (without limitation): request/query logic 203; authentication logic 205; and communication/compatibility logic 207. Similarly, smart moderation/validation mechanism 110 may further include description moderation/validation engine 211 including (without limitations): detection and scanning logic 213; content evaluation logic 215; scoring logic 217; decision and notification logic 219; and interface logic 221.

In one embodiment, computing device 120 may serve as a service provider core (e.g., Salesforce.com® core) for hosting and maintaining smart moderation/validation mechanism 110 and be in communication with one or more database(s) 140, client computer 130A, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, server computing device serving as media-extracted metadata-based software configuration device ("media-based software configuration device") 120 is shown in communication with client computing device 130A over one or more network(s) 135 (e.g., cloud network, Internet, etc.). In one embodiment, client devices, such as client device 130A, allow for a user to place queries, access information, etc., using one or more user interfaces as facilitated by tools and interfaces 222, where the user interface may serve as a layer above and associated with API(s) provided by a service provider (e.g., Salesforce.com®). As illustrated, client device 130A is shown as employing tools and interfaces 222, and communication logic 224.

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "query", "data", "images", "videos", "product", "description", "detail", "identifying", "detecting", "scanning", "scoring", "generating", "assigning", "comparing", "allowing", "disallowing", "facilitating", "threshold", "illegal", "offensive", "sensitive", "legal", "cultural", "political", "ethical", "religious", "traditional", "customary", "media", "advertising", "promoting", "sales cloud", "code", "metadata", "business software", "application", "database servers", "metadata mapping", "database", "detecting", "gathering", "identifying", "generating", "merging", "associating", "calculating", "computing", "determining", "classifying", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of client device 130A, code execution requests, and so forth.

In one embodiment, computing device 120 may implement request/query logic 203 to serve as a request/query interface via a web server or as a stand-alone interface to receive requests packets or other requests from the client device 130A. The request interface may further support the return of response packets or other replies and responses in an outgoing direction from computing device 120 to one or more client device 130A.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device 130A.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client device 130A, over one or more communication mediums, such as network(s) 140.

Conventional techniques do not provide for automatic or intelligent ways for identifying illegal or offensive language relating to products across various media formats. Such conventional techniques are manual, slow, and error-prone, and incapable of working with third-party systems.

Embodiments provide for a novel technique for moderation and/or validation of descriptions having contents relating to products to be advertised or promoted over a variety of media outlets using multiple media formats. Such products may be associated with multiple tenants in a multi-tenant database environment, where the tenants and the service provide (e.g., Salesforce.com®) may wish to maintain the products' reputation in good standing by removing any language for their descriptions that might be regarded as illegal, offensive, or sensitive, etc., whether it be regarded as such globally or locally.

It is contemplated and to be noted that embodiments described throughout this document apply equally to both products (such as any physical product, like clothes, furniture, etc.) and services (such as consumer services, like accounting services, landscaping, etc.); however, for the sake of brevity, clarity, and ease of understanding, "product" is referenced more often, interchangeably with "service", and in examples throughout this document but it is to be noted that embodiments also apply to "service".

It is contemplated that with the growing use of e-commerce (e.g., business to business, business to customer, etc.), any number and type of users have access to product descriptions in various parts of the world having varying laws, cultures, traditions, beliefs, customs, languages, etc. For example, certain products or descriptions relating to alcohol, nudity, weapons, etc., might be acceptable in certain parts of the world but not at all or at least not to the same extent in other parts of the world. Even physical gestures (e.g., thumbs up, high-five, etc.) and certain words (e.g., honey, negro, etc.) may differ in meaning from country to country or even region to region and such difference could range from polite to impolite to rude to even offensive. Such mishaps could be costly and lead to large numbers of potential consumers getting upset and shunning the product and event the company promoting or manufacturing the product.

It is further contemplated that there may be occasions when the description or details relating to a product may not actually relate to or even misrepresent the product. For example, the product may involve shoes, but the image may that be of a handbag or a shirt, or the video may that be of a bicycle. This is regarded as a mismatch and could create issues with the consumers who may not understand the product details, which may lead to the consumer not buying the product or even posting negative reviews regarding the product.

Embodiments provide for a novel technique for smartly detecting, moderating, and validating such disagreements and discrepancies, whether they be between the description and the product that the description is supposed to describe or the local laws or customers of a region where the product is to be promoted. This is to ensure that the reputation of the product or its brand may remain intact.

For example, sometimes images or videos captured by one or more cameras associated with computing device 120 may have some pertinent description relating to the product; however, the description may contain contents, such as images, languages, phrases, words, etc., that may be regarded as potentially offensive, risky, or simply undesirable, such as depicting or relating to drugs, violence, hate, nudity, weapons, gestures, minors, celebrities, and/or the like. For example, when large number of products get created or migrated using third-party systems, manual moderation or validation of product description may not be feasible given the number of products and the amount and volume of details relating these products.

Embodiments provide for a novel technique, as facilitated by smart moderation/validation mechanism 110, to detect such unacceptable content, moderate this content, and then validate the content so that only the appropriate and acceptable content is communicated with users/consumers over one or more media outlets (e.g., website, television, radio, etc.) over one or more communication networks (e.g., Cloud network, Internet, etc.). This allows preservation and maintenance of the reputation of the product, brand, company, etc.

It is contemplated that users associated with tenant or customer of a service provider (e.g., Salesforce.com®) may be allowed to add products and product details to their websites as they deem necessary and appropriate. For example, a user associated with a tenant known for shoes, garments, etc., may add description and picture of a new type of shoes offered by the tenant. Such pictures or videos of a product may be taken using one or more cameras and launched or uploaded onto a website using any number of techniques, such as a dropdown menu. Similarly, the user may upload a description designed to explain the product by either typing in the description or choosing it from a dropdown menu, etc.

In one embodiment, the aforesaid process of uploading products/services and their descriptions may be performed by a user on the client side, such as at client device 130A, through a user interface (e.g., Graphical User Interface, such as an application interface, a web browser, etc.) as provided by tools and interfaces 222, and further facilitated by interface logic 221. Once the process is completed, such as the product and its description are uploaded, this task may be communicated over to smart moderation/validation mechanism 110 over network(s) 135 through communication logic 224 and communication/compatibility logic 207.

However, prior to communicating any details of this uploaded product and description to the general public through media sources, such as a tenant website, these details are detected and received by detection and scanning logic 213 of description moderation/validation engine 211 at server device 120. Once received, detection and scanning logic 213 may be used to scan through the entire contents of the description to detect any inconsistencies or discrepancies between the product and the description (including images, videos, etc.) as well as with any violations of moderation rules based on policies, laws, or other protocols to ensure nothing unacceptable is communicated to the general public including any customers of the tenant.

Any initial detection and scanning results are then communicated over to content evaluation logic 215 to analyze to results to seek any mismatches or violations. Now, for example and as illustrated with respect to FIG. 3A, the produce is running shows, where product name 301 recites sneakers and text description 303 also talks of running shoes, but image description 305 is that of a shirt, then, upon analyzing this discrepancy, content evaluation logic 215 may classify this discrepancy as a "mismatch" and forward any pertinent information to decision and notification logic 219 to form an appropriate notification message, such as an error notification, which may then be communicated to the user, such as if the user clicks on save 307 or save & new 309, etc.

Figure 3A:
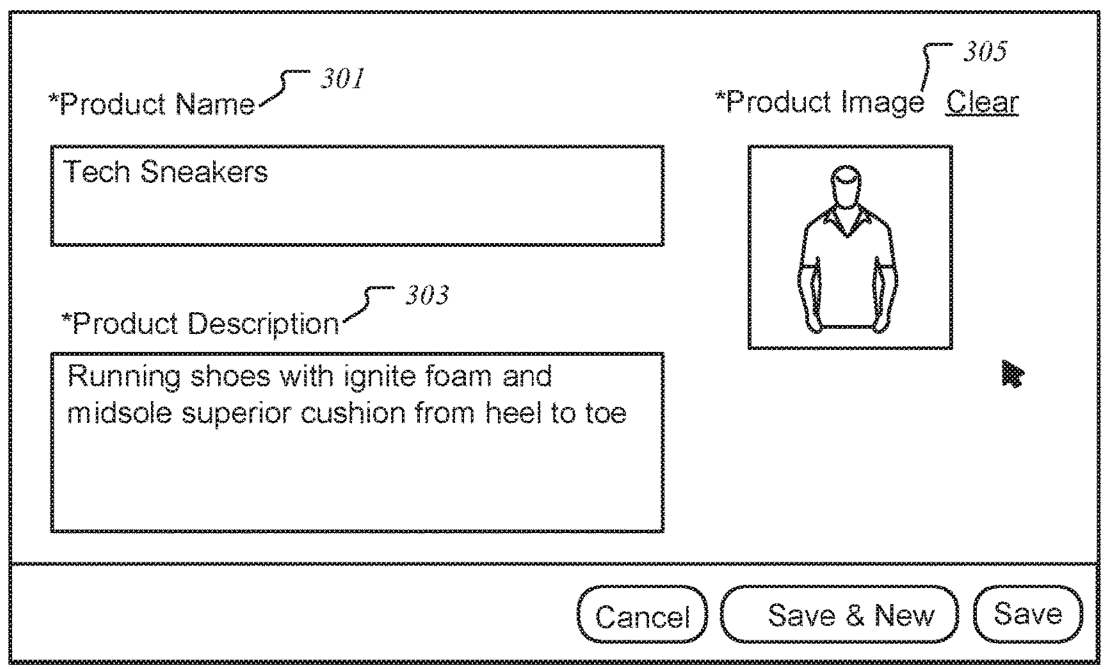
FIGS. 3A-3C illustrate a transaction sequence for facilitating validation of product/service description according to one embodiment
Figure 3B:
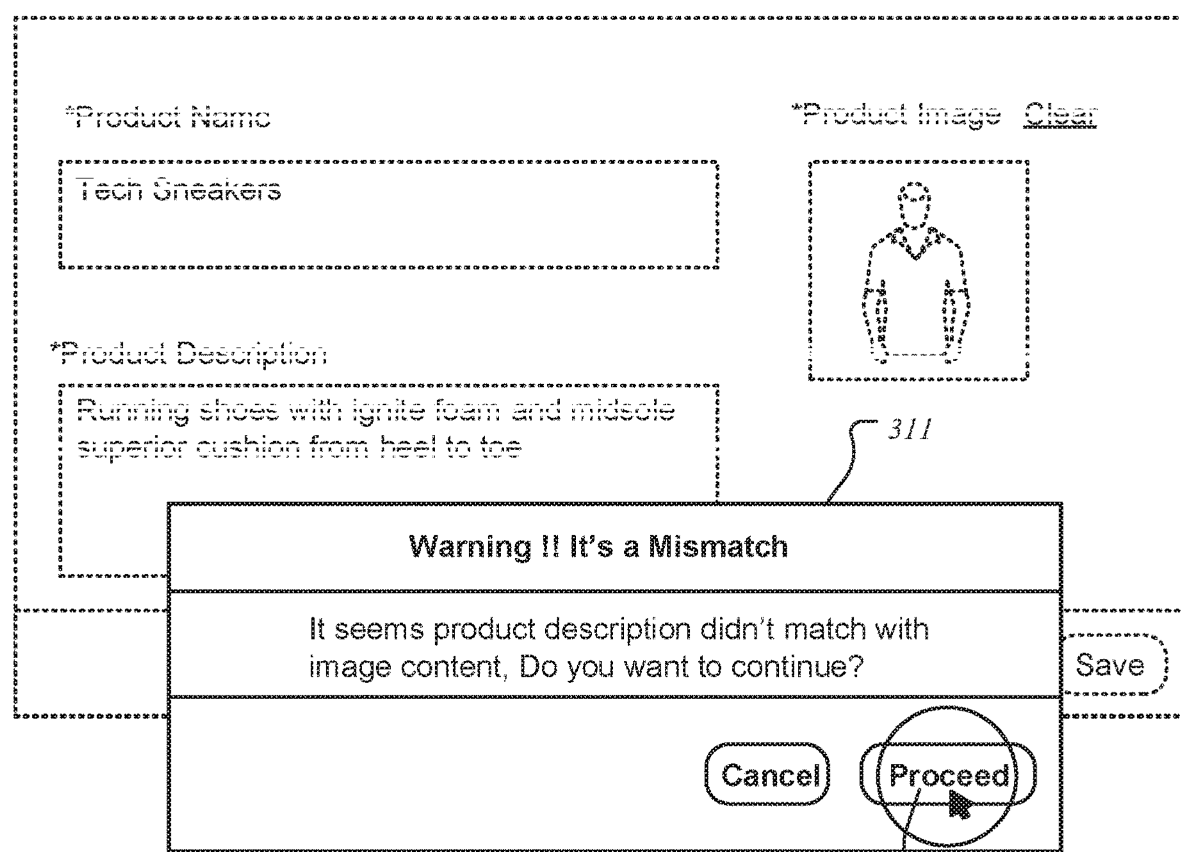

As further illustrated with respect to FIG. 3B, if the user attempts to save this task, such as by clicking on save 307 of FIG. 3A, then mismatch error notification 311 is displayed and communicated to the user. As facilitated by decision and notification logic 219, error notification 311 may contain any type and amount of content, but as illustrated in FIG. 3B, it may include a simply warning to notify the user of a mismatch prior to communicating any of this information to the general public. This allows the user to either cancel the transaction or proceed with it, despite the discrepancy, by simply clicking on proceed 313.

Figure 3C:
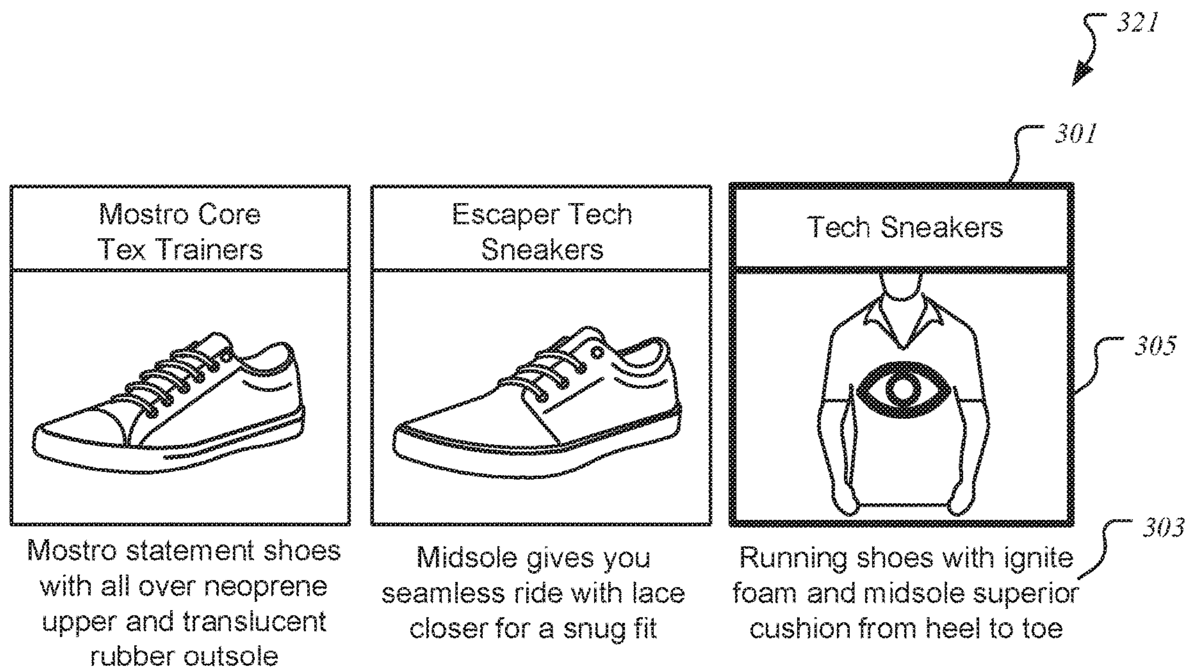

If the user chooses to proceed with completing the transaction (despite the error), then, as illustrated in FIG. 3C, decision and notification logic 219 may allow the user to proceed and post product details 321 including product name 301, product text description 303, and (incorrect) product image description 305 using a media source, such as a company website. As illustrated, such product details 321 may not be desirable and that in virtually all cases, the user may cancel the transaction and avoid such embarrassing product details 321 from being posted publicly by simply canceling the transaction in FIG. 3B when notified of this error through mismatch error notification 311.

As previously discussed, other than simply mismatches, there may be potential for more severe violations of rules, policies, laws, customs, etc., when contents (e.g., text, images, videos, etc.) that could be regarded as inappropriate, illegal, sensitive, offensive, etc., may be included in product details. Any such potential violations may be referred to as violations of moderation rule. In one embodiment, a moderation rule may be based on criteria like local laws, company policies, communication rules, local customs, etc., and assigned a threshold score and any words, phrases, images, videos, etc., also assigned scores, are detected to have values greater than the threshold score may be regarded as inappropriate.

For example, if threshold score is 60, then any content scoring greater than 60 may be regarded as inappropriate and in violation of the moderation rule. For example, images of weapons may be generally undesirable but, in some cases, a small gun that is a smart and irrelevant part of an image may be evaluated as acceptable by content evaluation logic 215 and, for example, assigned a score of 20 by scoring logic 217. In contrast, an image that is entirely of a gun or where the gun is big and clearly visible and seemingly important part of the image, then content evaluation logic 215 may regard the image as inappropriate and accordingly, scoring logic 217 may assign the image a score of 80, while decision and notification logic 219 may find it in violation of the moderation rule for having a score of greater than 60. Similarly, partial nudity may be given a score of 30, while full nudity may be assigned as score of 70, and/or the like.

It is contemplated and to be noted the aforesaid classifications, criteria, scores, threshold score, etc., are merely examples and that embodiments are not limited as such. For example, the threshold score may be dynamic and changing according to geography, cultures, times, circumstances, types of products, types of audience/customers, and/or the like.

Figure 3D:
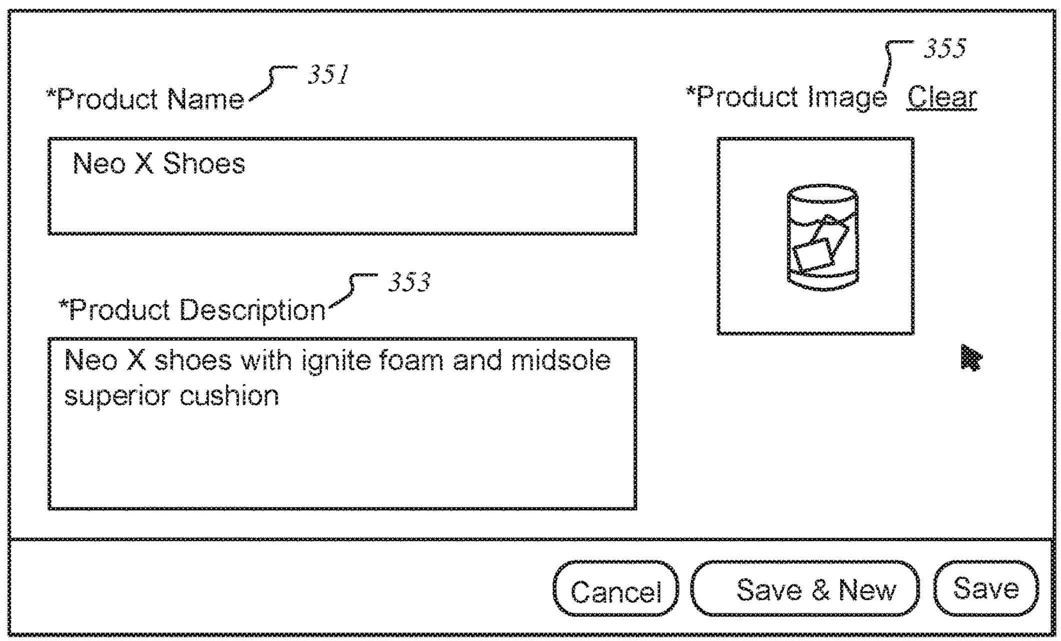
Figures 3E, 3F:
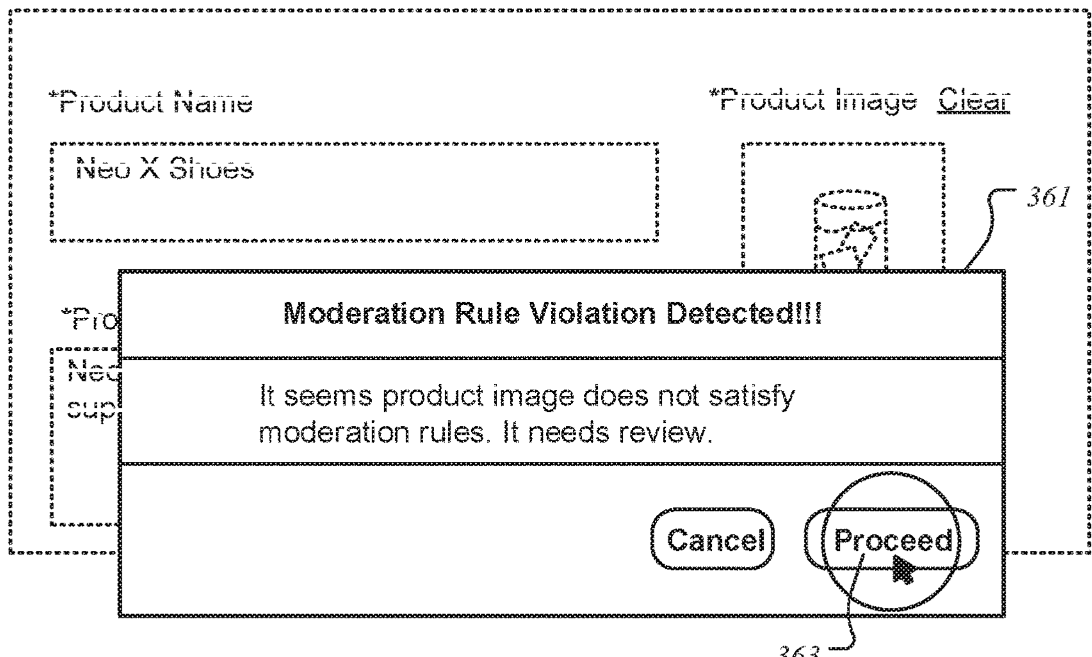

Continuing with these examples and referring to FIG. 3D, a user may select a new product, such as shoes, where product name 351 recites shoes, product text description 353 recites shoes, but product image description 355 shows what appears to be an alcoholic drink in a drinking glass. If the user attempts to save these product details by clicking on save 357 or save & new 359, then, as shown in FIG. 3E, an error notification 361 is displayed, as facilitated by decision and notification logic 219. For example, this error notification 361 may warn the user that the moderation rule has been violated, allowing the user to cancel the transaction or proceed with it by clicking on cancel or proceed 363, respectively.

As illustrated in FIG. 3F, production moderation rules 371 in this example may restrict or forbit displaying certain contents, such as drugs 373, weapons 375, and alcohol 377. Given product image description 355 of FIG. 3E appeared to be an alcoholic drink, it is in violation of at least one of these moderation rules 371, such as alcohol rule 377, as facilitated by content evaluation logic 215. Now, although not likely, the drinking glass may be used as a weapon, so there may be small score assigned to it, to match against another one of moderation rules 371, such as weapons rule 375, as facilitated by content evaluation logic 215. This is illustrated with respect to FIG. 3G, where alcohol 381 gains a value of 0.878 (e.g., 87.8%) and assigned, for example, a score of 75, while weapon 383 is assigned a value of 0.0055 (e.g., 0.55%) and assigned, for example, a score of 1, as facilitated by scoring logic 217.

In one embodiment, as facilitated by decision and notification logic 219, alcohol having assigned 75 points is more than the threshold score of 60 points and thus in violation of modification rules 371, such as alcohol rule 377. Further, as facilitated by decision and notification logic 219, these product details may not be posted for public viewing and instead, these product details 391 are communicated to a moderator (e.g., system administrator, database administrator, programmer, etc.) as shown in FIG. 3H. As with FIG. 3D, the moderator may view product name 351, product text description 353, and product image description 355 that is in violation of moderation rule 377 and given the options of approving or deleting the transaction by simply clicking on approve 391 and delete 393, respectively.

In one embodiment, as facilitated by interface logic 221, a moderation programming application interface (API) may be created and used to receive any texts, images, videos, etc., such as through uniform resource locators (URLs), as input parameters, as facilitated by detection and scanning logic 213. As facilitated by content evaluation logic 215 and scoring logic 217, scores may be generated for and assigned to the parameters, where one or more of these parameters may be classified as drugs, violence, alcohol, hate, offensive gestures, nudity, weapons, etc. As facilitated by decision and notification logic 219, those parameters having assigned scores that is greater than a predetermined and dynamic threshold score, then the contents associated with those parameters are blocked from being published for public viewing and instead, sent to a moderator for further reviewing and decision-making.

Further, in one embodiment, as facilitated by interface logic 221, a validation API may be created and used to compare any product text description with contents shown in any product images/videos, as facilitated by content evaluation logic 215. Upon comparison, confidence scores are generated for and assigned to objects available or illustrated in description images/videos and the matched with a product score assigned to the product text description, as facilitated by scoring logic 217. If an object score does not match up with the product score of the product text description, then a mismatch warning is displayed to the user via a user interface.

As mentioned previously, it is contemplated that queries may include any number and type of requests seeking responses for processing jobs, running reports, seeking data, etc. These queries are typically placed by users on behalf of tenants, using client device 130A. It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from smart moderation/validation mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

Figure 4A:
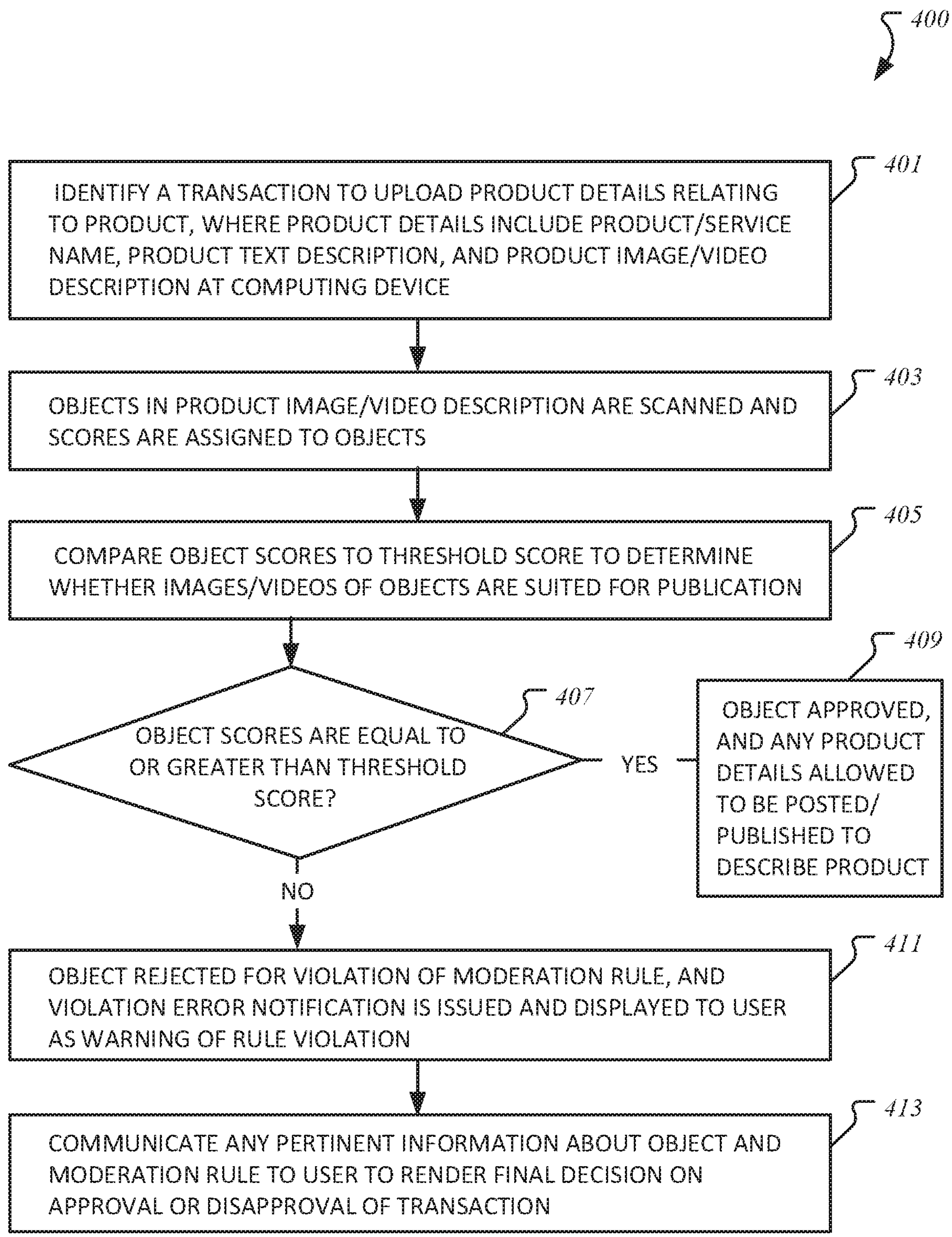
FIG. 4A illustrates a method for facilitating moderation of product/service description according to one embodiment.

FIG. 4A illustrates a method 400 for facilitating moderation of product/service description according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of smart moderation/validation mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3H may not be repeated or discussed hereafter.

Method 400 starts at 401 with identification of a transaction that includes a user attempting to upload a product/ service name, product text description, and product image/video description at a computing device accessible to the user associated with a tenant. At 403, in one embodiment, objects in the product image/video are scanned and scores are assigned to each of the objects in the product image/video. In one embodiment, these scores are assigned based on a predetermined assessment of certain parameters, such as drugs, violence, nudity, alcohol, weapons, gestures, hate speech, etc. Similarly, in one embodiment, a threshold score is generated based on any pertinent laws, policies, rules, customs, traditions, common decency, etc., where this threshold score represents a set of moderation rules and a minimum level of acceptability for publishing an object displayed in an image/video.

At 405, in one embodiment, these assigned object scores are compared to the threshold score to determine if the objects in the video/image description are suited for publication. For example, if an object score is less the threshold score, the image/video having the object is rejected, where if an object score is equal to or greater than the threshold score, the image/video having the object is accepted and allowed for publication. At 407, a determination is made as to whether any of the object scores are equal to or greater than the threshold score. If yes, the object is approved, and any product details allowed to be posted/published for public viewing at 409. If not, the object is rejected for violation at least one from the set of moderation rules and a violation error notification is issued as a warning to the user 411. At 413, any pertinent information is forwarded on to at a computing device accessible to a moderator for the moderator to decide on whether to approve or delete the transaction or at the object in violation of at least one moderation rule.

Figure 4B:
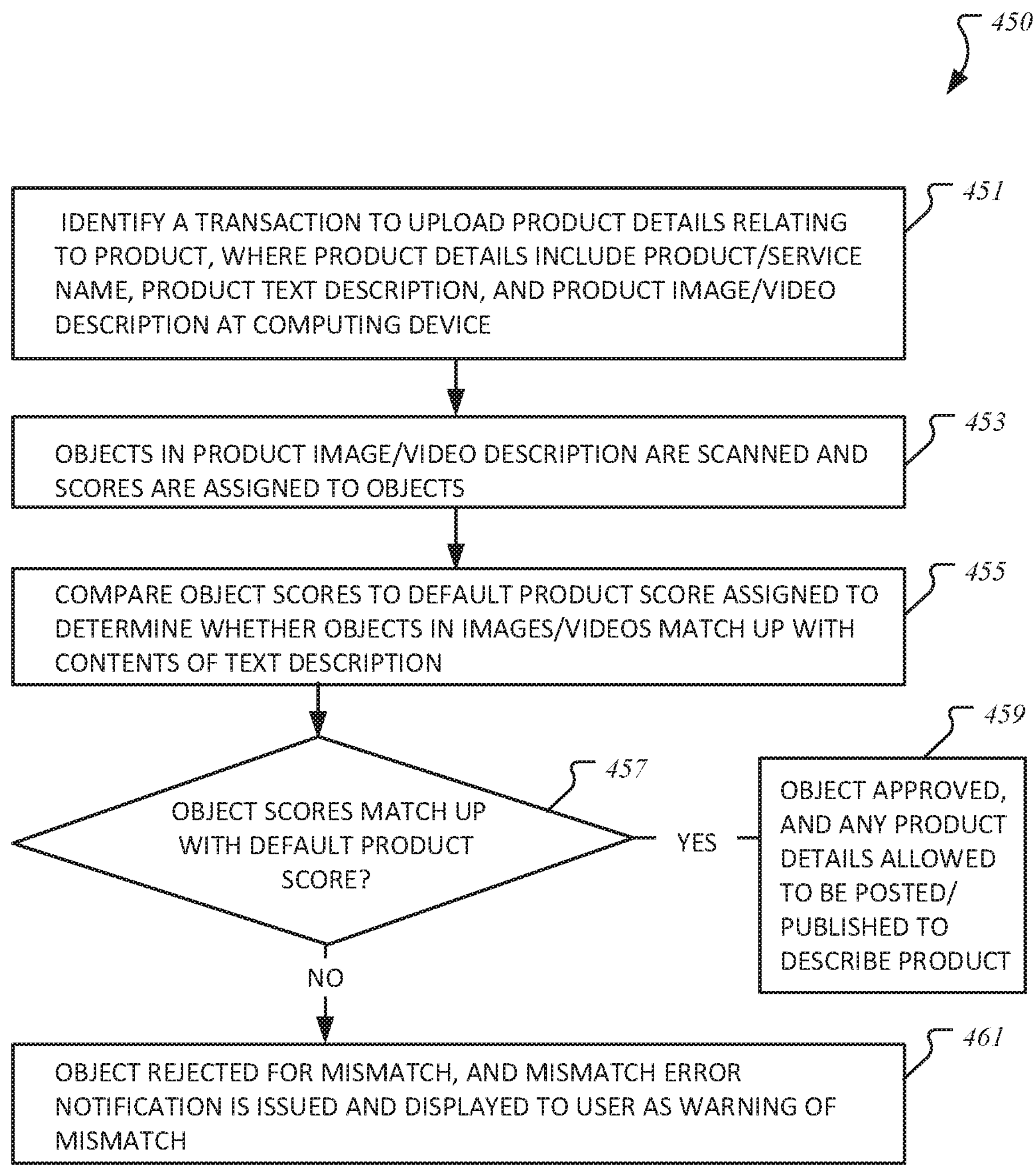
FIG. 4B illustrates a method for facilitating validation of product/service description according to one embodiment.

FIG. 4B illustrates a method 400 for facilitating validation of product/service description according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of smart moderation/validation mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3H may not be repeated or discussed hereafter Method 450 starts at 451 with identification of a transaction that includes a user attempting to upload a product/service name, product text description, and product image/video description at a computing device accessible to the user associated with a tenant. At 453, objects in the product image/video are scanned and scores are assigned to each of the objects in the product image/video. At 455, the object scores are compared to the default product score assigned to the product text description to determine if the objects in the video/image description match up with the contents in the text description. At 457, a determination is made as to whether the scores match up. If yes, the transaction is approved, and the product details are posted/published for public viewing at 459. If, however, the scores are not matched, a mismatch error notification is issued and displayed to the user warning the user of the mismatch at 461.

Figure 5:
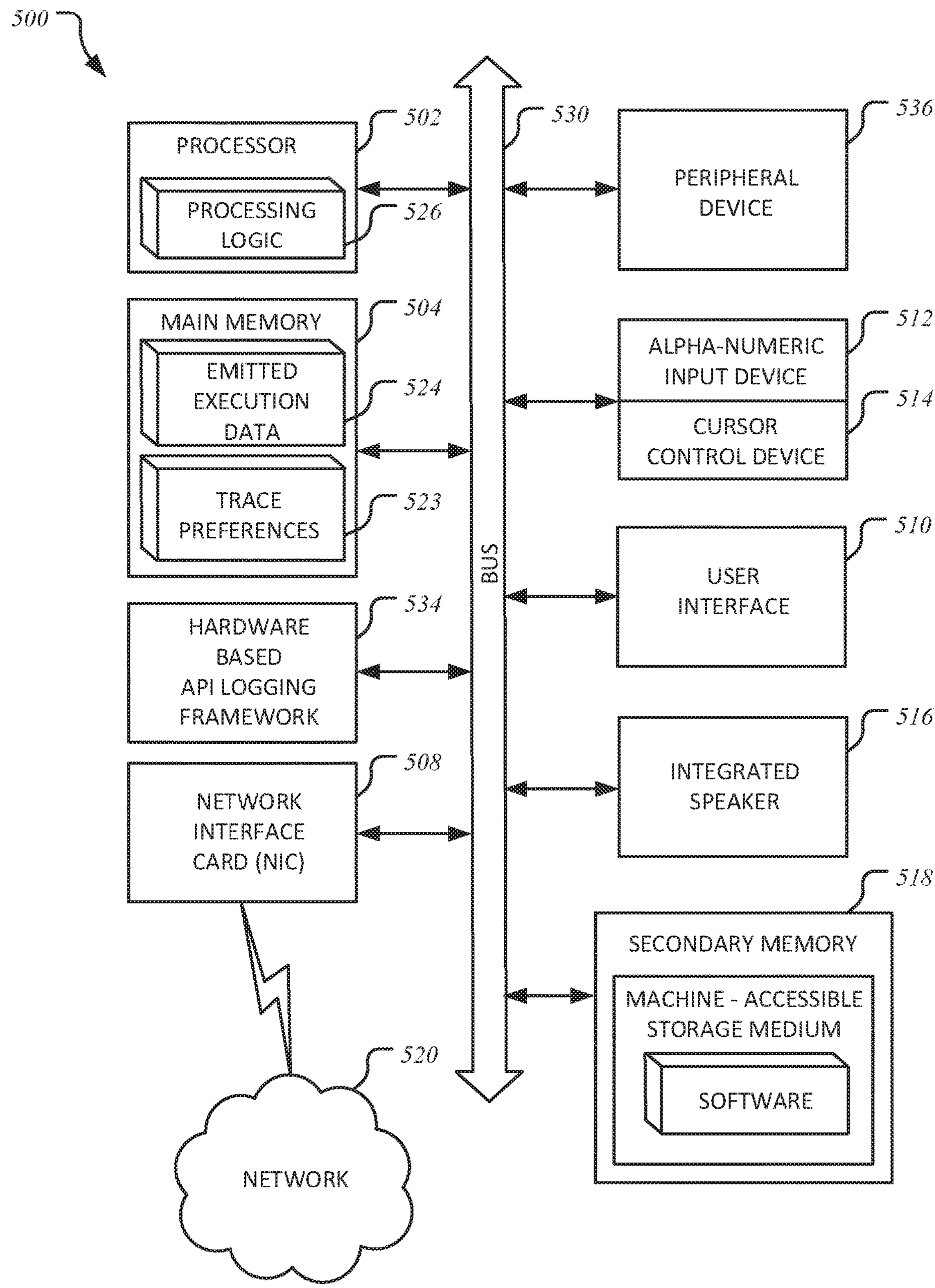
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of smart moderation/validation mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of smart moderation/validation mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
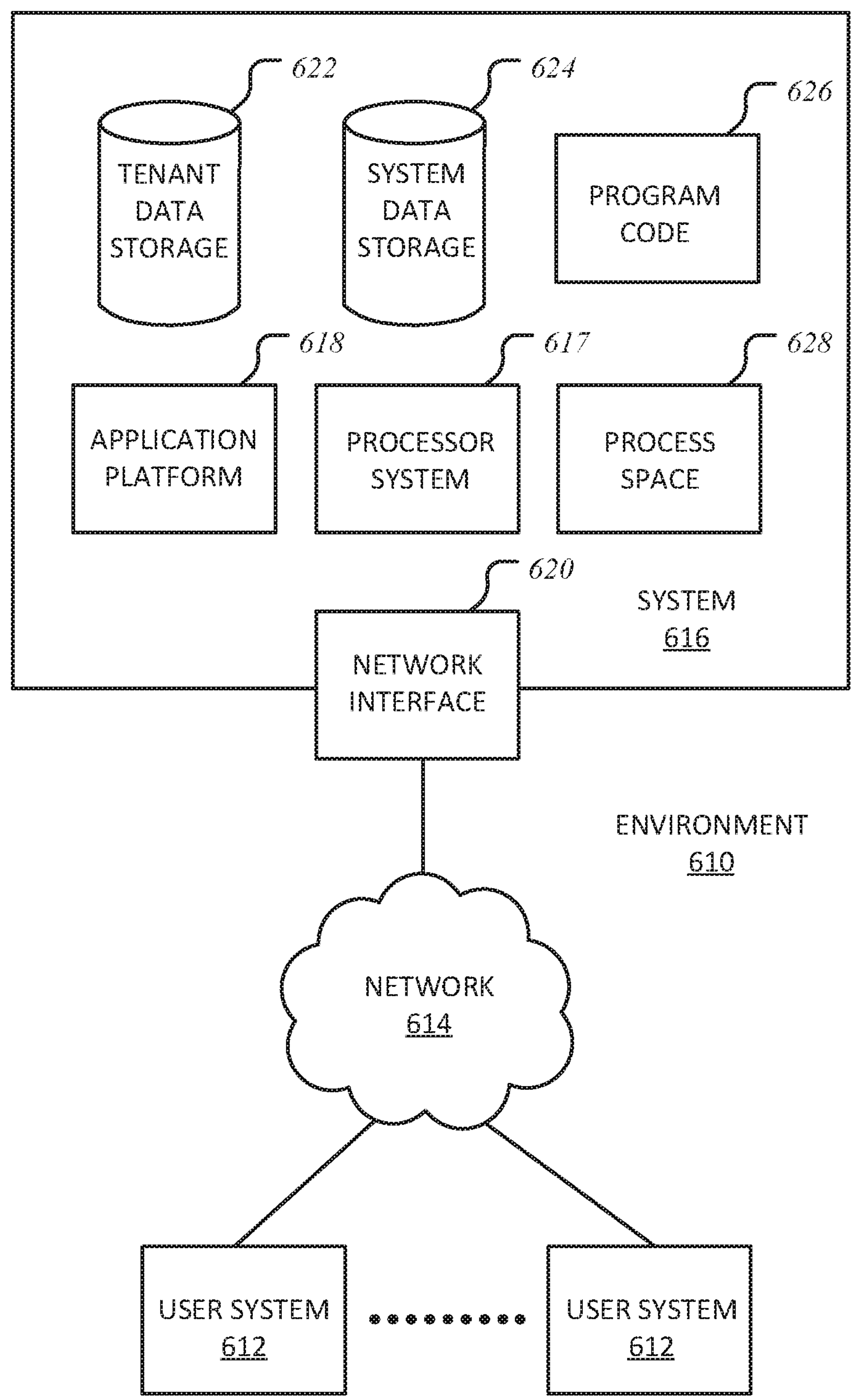
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
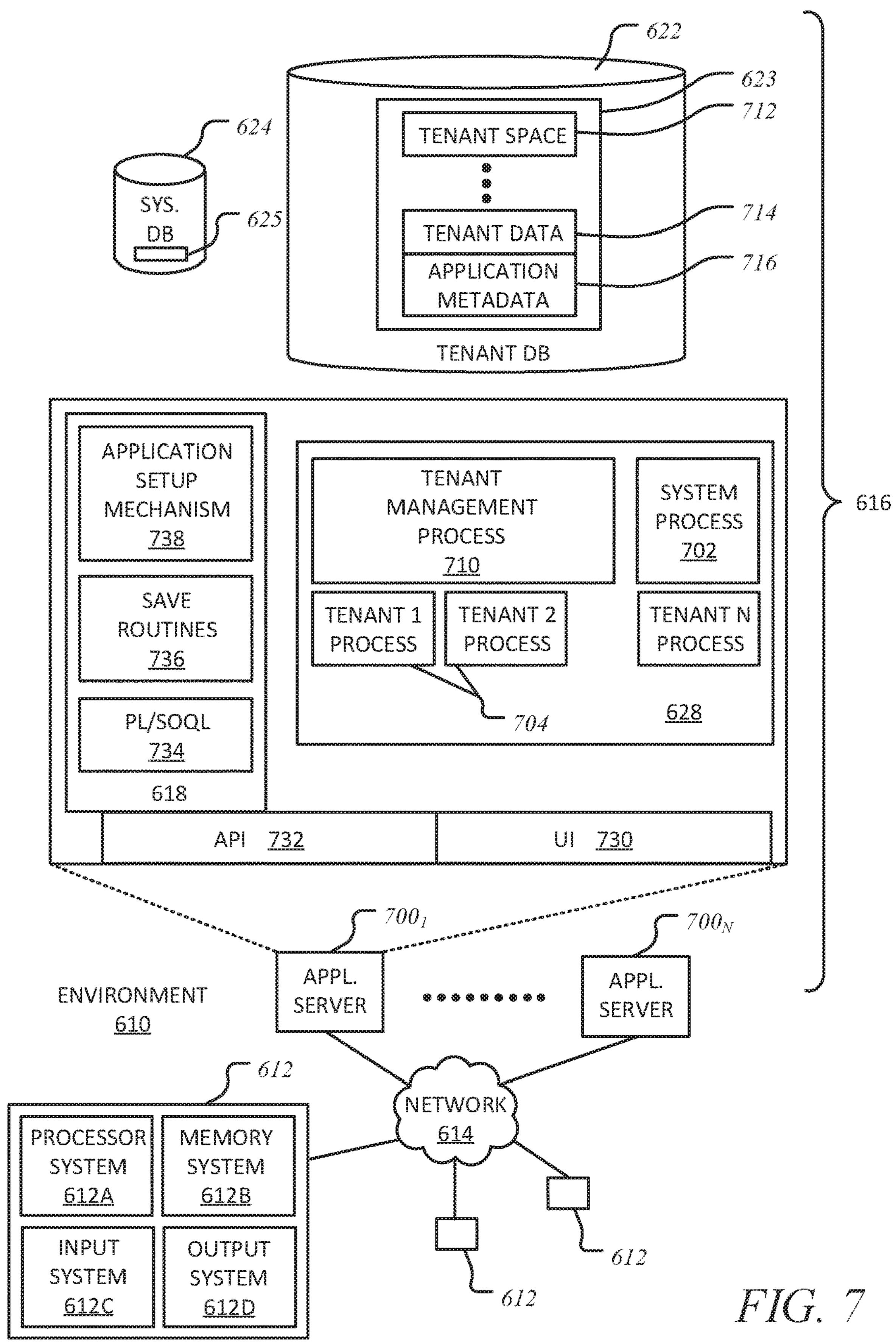
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $\mathbf{700}_1$-$\mathbf{700}_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $\mathbf{700}_1$ might be coupled via the network 614 (e.g., the Internet), another application server $\mathbf{700}_{N-1}$ might be coupled via a direct network link, and another application server $\mathbf{700}_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:

identifying images for use in a media description associated with a product, wherein the media description is to be communicated using one or more media outlets over one or more communication networks, and wherein the images are captured using one or more cameras;

detecting an image in the identified images having an object potentially not suitable for communication based on a rule;

assigning a first score to the object;

assigning a second score to text corresponding to the media description;

comparing the first score to a threshold reflecting a minimum level of suitability for communication of the media description based on the rule;

creating a validation API;

comparing the second score to the first score using the validation API;

disallowing the object or the image to be communicated when the validation API compares the first score and the second score and determines that the second score does not match the first score; and facilitating publication, by a website, of the media description without the object or the image.

2. The method of claim 1, wherein the media description further includes videos, separate from the identified images, describing the product, wherein the product is associated with a tenant in a multi-tenant database environment, wherein the media description having the images or the videos is further configured to describe a service facilitated by the tenant.

3. The method of claim 1, further comprising allowing the object or the image in the identified images to be communicated when the score of the object is equal to or greater than the threshold, wherein the threshold is dynamically determined based on the rule having a moderation rule based on one or more of laws, regulations, policies, customs, traditions, and common decency, wherein the moderation rule is designed to forbid or limit publishing or displaying of content exhibiting one or more of weapons, alcohol, drugs, nudity, hatred, intolerance, and indecent or offensive gestures.

4. The method of claim 1, further comprising:

prior to disallowing the object or the image, issuing a rule violation notification indicating the rule has been violated by the score not meeting the threshold, wherein the rule violation notification is displayed on a screen via a user interface; and forwarding product details having the media description to a separate computing device accessible to a moderator to allow for a decision on accepting or rejecting the object or the image for publication.

5. The method of claim 1, further comprising:

comparing the media description associated with the product with a text description associated with the product, wherein comparing includes matching a media score associated with the media description to a text score associated with the text description; and classifying the media description and the text description to be a mismatch when the media score does not match up with the text score.

6. The method of claim 5, further comprising issuing a mismatch notification warning of or indicating one or more discrepancies between the media description and the text description.

7. A database system comprising:

a server computing device having a processing device and a storage device having instructions, the processing device to execute the instructions to facilitate a mechanism to perform operations comprising:

identifying images for use in a media description associated with a product, wherein the media description is to be communicated using one or more media outlets over one or more communication networks, and wherein the images are captured using one or more cameras;

detecting an image in the identified images having an object potentially not suitable for communication based on a rule;

assigning a first score to the object;

assigning a second score to text corresponding to the media description;

comparing the first score to a threshold reflecting a minimum level of suitability for communication of the media description based on the rule;

creating a validation API;

comparing the second score to the first score using the validation API;

disallowing the object or the image to be communicated when the validation API compares the first score and the second score and determines that the second score does not match the first score; and facilitating publication, by a website, of the media description without the object or the image.

8. The system of claim 7, wherein the media description further includes videos, separate from the identified images, describing the product, wherein the product is associated with a tenant in a multi-tenant database environment, wherein the media description having the images or the videos is further configured to describe a service facilitated by the tenant.

9. The system of claim 7, wherein the operations further comprise allowing the object or the image in the identified images to be communicated when the score of the object is equal to or greater than the threshold, wherein the threshold is dynamically determined based on the rule having a moderation rule based on one or more of laws, regulations, policies, customs, traditions, and common decency, wherein the moderation rule is designed to forbid or limit publishing or displaying of content exhibiting one or more of weapons, alcohol, drugs, nudity, hatred, intolerance, and indecent or offensive gestures.

10. The system of claim 7, wherein the operations further comprise:

prior to disallowing the object or the image, issuing a rule violation notification indicating the rule has been violated by the score not meeting the threshold, wherein the rule violation notification is displayed on a screen via a user interface; and forwarding product details having the media description to a separate computing device accessible to a moderator to allow for a decision on accepting or rejecting the object or the image for publication.

11. The system of claim 7, wherein the operations further comprise:

comparing the media description associated with the product with a text description associated with the product, wherein comparing includes matching a media score associated with the media description to a text score associated with the text description; and classifying the media description and the text description to be a mismatch when the media score does not match up with the text score.

12. The system of claim 11, wherein the operations further comprise issuing a mismatch notification warning of or indicating one or more discrepancies between the media description and the text description.

13. A computer-readable medium comprising a plurality of instructions which, when executed by a computing device, cause the computing device to perform operations comprising:

identifying images for use in a media description associated with a product, wherein the media description is to be communicated using one or more media outlets over one or more communication networks, and wherein the images are captured using one or more cameras;

detecting an image in the identified images having an object potentially not suitable for communication based on a rule;

assigning a first score to the object;

assigning a second score to text corresponding to the media description;

comparing the first score to a threshold reflecting a minimum level of suitability for communication of the media description based on the rule;

creating a validation API;

comparing the second score to the first score using the validation API;

disallowing the object or the image to be communicated when the validation API compares the first score and the second score and determines that the second score does not match the first score; and facilitating publication, by a website, of the media description without the object or the image.

14. The computer-readable medium of claim 13, wherein the media description further includes videos, separate from the identified images, describing the product, wherein the product is associated with a tenant in a multi-tenant database environment, wherein the media description having the images or the videos is further configured to describe a service facilitated by the tenant.

15. The computer-readable medium of claim 13, wherein the operations further comprise allowing the object or the image in the identified images to be communicated when the score of the object is equal to or greater than the threshold, wherein the threshold is dynamically determined based on the rule having a moderation rule based on one or more of laws, regulations, policies, customs, traditions, and common decency, wherein the moderation rule is designed to forbid or limit publishing or displaying of content exhibiting one or more of weapons, alcohol, drugs, nudity, hatred, intolerance, and indecent or offensive gestures.

16. The computer-readable medium of claim 13, wherein the operations further comprise prior to disallowing the object or the image, issuing a rule violation notification indicating the rule has been violated by the score not meeting the threshold, wherein the rule violation notification is displayed on a screen via a user interface; and forwarding product details having the media description to a separate computing device accessible to a moderator to allow for a decision on accepting or rejecting the object or the image for publication.

17. The computer-readable medium of claim 13, wherein the operations further comprise:

comparing the media description associated with the product with a text description associated with the product, wherein comparing includes matching a media score associated with the media description to a text score associated with the text description; and classifying the media description and the text description to be a mismatch when the media score does not match up with the text score.

18. The computer-readable medium of claim 17, wherein the operations further comprise issuing a mismatch notification warning of or indicating one or more discrepancies between the media description and the text description.

* * * * *